(12) United States Patent
Nkansah et al.

(10) Patent No.: US 6,583,228 B2
(45) Date of Patent: Jun. 24, 2003

(54) COPOLYMERS OF HIGH VINYLIDENE POLYOLEFINS WITH VINYL OR VINYLIDENE MONOMERS PRODUCED BY FREE RADICAL POLYMERIZATION

(75) Inventors: Asare Nkansah, Naperville, IL (US); Vahid Bagheri, Winfield, IL (US); Lionel Moore, Lisle, IL (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

(21) Appl. No.: 09/171,574

(22) PCT Filed: Feb. 17, 1998

(86) PCT No.: PCT/US98/02990
§ 371 (c)(1),
(2), (4) Date: Oct. 21, 1998

(87) PCT Pub. No.: WO98/37112
PCT Pub. Date: Aug. 27, 1998

(65) Prior Publication Data
US 2002/0161156 A1 Oct. 31, 2002

Related U.S. Application Data

(60) Provisional application No. 60/042,036, filed on Mar. 28, 1997, provisional application No. 60/042,114, filed on Mar. 28, 1997, provisional application No. 60/042,043, filed on Feb. 25, 1997, and provisional application No. 60/039,123, filed on Feb. 25, 1997.

(51) Int. Cl.[7] ............................................. C08F 290/04
(52) U.S. Cl. .................. 525/242; 525/298; 525/301; 525/302; 526/348.3; 526/348.8; 526/319
(58) Field of Search ................................. 525/242, 276, 525/293, 296, 298, 301, 302, 313, 317, 319, 320; 526/348.3, 348.8, 319

(56) References Cited

U.S. PATENT DOCUMENTS

| 4,524,188 A | * | 6/1985 | Kennedy et al. | .......... 525/333.7 |
| 5,733,993 A | * | 3/1998 | Yu et al. | ...................... 526/272 |
| 6,100,224 A | * | 8/2000 | Peiffer et al. | ................ 525/301 |

FOREIGN PATENT DOCUMENTS

| DE | 19528369 | * | 8/1995 |
| EP | 549 064 | * | 12/1992 |
| WO | WO 95/07944 | * | 3/1995 |

OTHER PUBLICATIONS

Grant and Hackh's Chemical Dictionary, McGraw–Hill, p620, 1989.*
Mulhaupt et al., Polymers For Advances Technologies4 (1993) Aug, No. 7.*

* cited by examiner

Primary Examiner—Jeffrey Mullis
(74) Attorney, Agent, or Firm—James R. Henes

(57) ABSTRACT

The present invention relates to novel compositions useful in coating, adhesive, structural, film, sheet, pipe, toys, house siding, asphalt, thermoplastic, elastomer and other applications. The novel compositions comprise copolymers of at least one vinyl and/or vinylidene monomer and at least one high reactivity polyolefin. The copolymers are produced by polymerizing at least one high reactivity polyolefin and at least one vinyl monomer in the presence of a free radical initiator.

10 Claims, No Drawings

COPOLYMERS OF HIGH VINYLIDENE POLYOLEFINS WITH VINYL OR VINYLIDENE MONOMERS PRODUCED BY FREE RADICAL POLYMERIZATION

This application is a 371 of PCT/US98/02990, filed Feb. 17, 1998, which claims the benefit of provisional applications 60/042,036, filed Mar. 28, 1997 and 60/042,114, filed Mar. 28, 1997 and 60/042,043, filed Feb. 25, 1997 and 60/039,123, filed Feb. 25, 1997.

FIELD OF THE INVENTION

The present invention relates to a copolymer of vinyl or vinylidene monomers and a high reactivity polyolefin which is produced by free radical polymerization. The copolymers are useful in many applications, including coatings and adhesives and exhibit improved water resistance, impact strength, flexibility, and processability in many applications.

BACKGROUND OF THE INVENTION

Blends of two or more polymers have often been made, for example in attempts to combine desirable properties of the individual polymers into the blend, to seek unique properties in the blend, or to produce less costly polymer products by including less expensive or scrap polymers in the blend. Compatible polymers tend to form blends that contain small domains of the individual polymers; in the case of "miscible" polymers these occur at the molecular scale, resulting in properties usually considered characteristic of a single polymer. These may include the occurrence of a single glass-transition temperature and optical clarity. Compatible polymers that are not strictly miscible are still likely to form blends with properties that approach those of the miscible blends. Such properties as tensile strength, which rely upon adhesion of the domains to one another, tend not to be degraded when compatible polymers are blended.

Many polymers are poorly compatible with one another, and poor compatibility cannot necessarily be predicted accurately for a given polymer combination, but in general it may be expected when non-polar polymers are blended with more polar polymers. Poor compatibility in a blend can be determined by those skilled in the art, and often evidences itself in poor tensile strength or other physical properties, especially when compared to the component polymers of the blend. Microscopic evidence of poor compatibility may also be present, in the form of large, poorly adhered domains of one or more polymer components in a matrix of another polymer component of the blend. More than one glass-transition temperature may be observed, and a blend of otherwise transparent polymers may be opaque because the domain sizes are large enough to scatter visible light.

Much research has been directed toward finding ways to increase the compatibility of poorly compatible polymers when blended. Approaches that have been used include adding to the blend polymers which show incompatibility with the other, mutually compatible polymers; such added polymers act as a bridge or interface between the incompatible components, and often decrease domain size. Chlorinated polyethylene has been used as such an additive polymer, especially in blends of polyolefins with other, poorly compatible polymers.

Graft polymers, as of incompatible polymers A onto B, are known to aid in blending polymers A and B. Such graft polymers may also serve to aid in blending other incompatible polymers C and D, where A and C are compatible and B and D are compatible. Grafting of monomers capable of vinyl polymerization, such as, methyl methacrylate, styrene and the like, onto polyolefins has been attempted by many means. Grafting onto solid polymer by vapor-phase polymerization, by reaction in an extruder, by peroxidation of the olefinic backbone, and grafting onto pendant double bonds are all routes which have been attempted.

For example, U.S. Pat. Nos. 5,128,410 and 5,229,456 disclose a polymerized olefin having grafted thereto, by covalent bonding, a polymeric methacrylate chain of relatively high molecular weight. The methacrylate chain has a weight average molecular weight (Mw) of at least 20,000 and advantageously between about 30,000 and 150,000. The resulting polyolefin copolymer has a weight average molecular weight between about 50,000 and 1,000,000, preferably a weight average molecular weight of about 200,000–800,000. In the method of manufacturing the grafted copolymer, a non-polar polyolefin, preferably polypropylene or polyethylene, is introduced into an inert hydrocarbon solvent which dissolves (or swells) the polyolefin, by heating to a temperature at which the polyolefin is dissolved. While agitating the solution, methyl methacrylate (MMA) monomer, together with an initiator which generates a constant, low radical flux concentration sufficient to initiate polymerization of the monomer at the temperature of the solution and promote the formation of the covalent bond, is gradually added. The polyolefin with a side-chain grafted thereto is thereafter separated from the solvent by volatilizing the solvent, preferably in a devolatilizing extruder. The graft polymer is then blended with a suitable polyolefin such as polypropylene or polyethylene, and extruded into a desired shape.

U.S. Pat. No. 5,112,507 generically discloses compositions which comprise copolymers of an unsaturated acidic reactant and high molecular weight olefin wherein at least about 20 percent of the total high molecular weight olefin comprises the alkylvinylidene isomer, said copolymers having alternating succinic and polyalkyl groups. The only unsaturated acidic reactant exemplified is maleic acid. The high molecular weight olefin has a sufficient number of carbon atoms such that the resulting copolymer is soluble in lubricating oil. Suitable olefins include those having about 32 carbon atoms or more (preferably having about 52 carbon atoms or more). Preferred high molecular weight olefins include polyisobutenes. Especially preferred are polyisobutenes having number average molecular weights of from about 500 to about 5000 and in which the alkylvinylidene isomer comprises at least 50 percent of the total olefin. The copolymers are disclosed to be useful as dispersants in lubricating oils and fuels.

D.E. 4,030,399 discloses that polymers and copolymers of propylene which, to some extent, have vinylidene terminal groups can be functionalized to give polymers and copolymers of propylene with 0 to 40 wt % of other $C_2$ and $C_8$ 1-alkenes, having number average molecular weights (Mn) of 100 to 100,000, a Mw/Mn of 1 to 3, and one functional chain end per macromolecule where "functionality" means a group containing a heteroatom which is bonded to a C atom. Polypropylene homopolymer is the only polymer exemplified. The functionalized polymers can be reacted with polar polymers to give copolymers of propylene.

Published European Patent Application No. 95110985.9 discloses conversion products of polyolefins with predominantly terminal double bonds and a numerical mean number average molecular weight of 250 to 10,000, which have an aliphatic hydrocarbon skeleton which is straight chain or carries $C_1$–$C_4$ alkyl side chains, with 1 to 10 mol per equivalent of double bond of one or more vinyl esters obtainable by reacting the disclosed polyolefins with the vinyl esters in the presence of a free radical initiator at temperatures of 40 to 220° C., whereby these reaction products are then hydrolyzed to the corresponding alcohol or can be converted to the corresponding amines by reductive amination. The conversion products are used in fuel and lubricant compositions as additives.

U.S. Pat. No. 4,062,908 discloses the preparation of vinyl ester copolymers; more particularly, a free-radical induced bulk copolymerization of ethylenically unsaturated compounds is described. The use of the resulting copolymers for coating applications, particularly in non-aqueous dispersions, is also described. The patent discloses a process for the preparation of copolymers of monoethylenically unsaturated compounds in the presence of a free-radical forming initiator by bulk copolymerization as follows: A. 1–50 parts by weight of vinyl esters of saturated aliphatic monocarboxylic acids in which the carboxyl group is attached to a tertiary or quaternary carbon atom, and which carboxylic acids have at least 9 carbon atoms per molecule; B. 1–60 parts by weight of a vinyl aromatic hydrocarbon; C. 0–50 parts by weight of an ester, amide, and/or nitrite of an ethylenically unsaturated monocarboxylic acid having 3 to 4 carbon atoms per molecule; D. 0–30 parts by weight of an ester of an ethylenically unsaturated dicarboxylic acid having 4–5 carbon atoms per molecule; E. 0–20 parts by weight of an ethylenically unsaturated mono- or dicarboxylic acid, or anhydride thereof, having 3–5 carbon atoms per molecule, and F. 1–20 parts by weight of a monoethylenically unsaturated polymeric hydrocarbon having a molecular weight higher than 1000; with the total amount of ethylenically unsaturated monomers being 100 parts by weight. The process is characterized in that a reactor charge containing component (F) and, optionally part of the initiator, is heated to at least 150° C., whereupon the other monoethylenically unsaturated components and initiator are gradually added during a period of from about 3 to 24 hours at a reaction temperature between 150° C. and 200° C. in one or more stages.

SUMMARY OF THE INVENTION

The present invention is a copolymer of at least one vinyl monomer and at least one high vinylidene polyolefin having a terminal vinylidene content of at least about 40%, preferably at least about 50% and more preferably at least about 60% and a number average molecular weight of about 200 to about 10,000, preferably about 300 to about 7,500, more preferably about 500 to about 5,000, most preferably about 500 to about 3,000. Copolymers of the present invention and produced by the method of the present invention generally have number average molecular weights of from about 80,000 to about 1,500,000 preferably about 300,000 to about 1,000,000. The aforesaid vinyl monomer is a compound of the formula $CH_2$=$C(R)X$ where R is hydrogen or $C_1$–$C_6$ alkyl and X is halogen; phenyl; or phenyl substituted with $C_1$–$C_4$ alkyl; —$COOR^1$ where $R^1$ is hydrogen or $C_1$–$C_{12}$ alkyl; —C≡N; —$C(O)NR^2R^3$ where $R^2$ and $R^3$ are hydrogen or $C_1$–$C_4$ alkyl and may be the same or different; —$(CH_2)_n COOR^1$ where $R^1$ is hydrogen or $C_1$–$C_{12}$ alkyl and n is an integer of from 1 to 4; or —CH=CHZ where Z is hydrogen or $C_1$–$C_8$ alkyl; or where both R and X are halogen. Preferably the aforesaid vinyl monomer is a compound of the formula: $CH_2$=CHX where X is chlorine, phenyl, or phenyl substituted with $C_1$–$C_4$ alkyl; $CH_2$=$C(R)COOR^1$ where R is hydrogen or $C_1$–$C_4$ alkyl and $R^1$ is hydrogen or $C_1$–$C_{10}$ alkyl; $CH_2$=CHC≡N; $CH_2$=$CHC(O)NR^2R^3$ where $R^2$ and $R^3$ are hydrogen or $C_1$–$C_4$ alkyl and may be the same or different; $CH_2$=$C(R)(CH_2)_n COOR^1$ where R is hydrogen or $C_1$–$C_4$ alkyl, $R^1$ is hydrogen or $C_1$–$C_{10}$ alkyl and n is an integer of from 1 to 4; or $CH_2$=CH—CH=CHZ where Z is hydrogen or $C_1$–$C_4$ alkyl. More preferably, the aforesaid vinyl monomer is methacrylic acid, methyl methacrylate, butyl acrylate, butadiene, 2-ethylhexyl acrylate, styrene or vinyl chloride. Preferably the aforesaid high reactivity polyolefin is polyisobutylene.

A copolymer of the present invention is prepared in the method of the present invention by reacting at least one aforesaid high reactivity polyolefin and at least one aforesaid vinyl monomer reactant in the presence of a free radical initiator under polymerization conditions.

The present invention also includes compositions containing a copolymer of the present invention and useful in coating, adhesive, paint, structural, film, sheet pipe, toy, house siding, asphalt, thermoplastic and elastomer applications. The present invention also includes a coating composition containing a copolymer of the present invention. The present invention is also a multilayer structure comprising at least one substrate coated with at least one layer of a coating comprising a copolymer of the present invention. The substrate may be any material capable of being coated with a copolymer of the invention or a coating composition containing a copolymer of the invention. Such substrates may include, but are not limited to metal, wood, concrete, plastic, paper, textiles, polymers, glass, fiberboard, composites, fibers porcelain, polymers films and sheets, and the like.

DESCRIPTION OF THE PREFERRED EMBODIMENTS

The present invention relates to a copolymer of at least one high reactivity polyolefin having a terminal vinylidene content of at least about 40% and a number average molecular weight of about 200 to about 10,000 and at least one vinyl monomer of the formula $CH_2$=$C(R)X$ where R is hydrogen or $C_1$–$C_6$ alkyl and X is halogen, phenyl, phenyl substituted with $C_1$–$C_4$ alkyl, —$COOR^1$ where $R^1$ is hydrogen or $C_1$–$C_{12}$ alkyl, —C≡N, —$C(O)NR^2R^3$ where $R^2$ and $R^3$ are hydrogen or $C_1$–$C_4$ alkyl and may be the same or different, —$(CH_2)_n COOR^1$ where $R^1$ is hydrogen or $C_1$–$C_{12}$ alkyl and n is an integer of from 1 to 4, or —CH=CHZ where Z is hydrogen or $C_1$–$C_8$ alkyl; or where both R and X are halogen (in which case the aforesaid vinyl monomer is a vinylidene monomer such as vinylidene chloride or vinylidene fluoride).

In one preferred embodiment, the aforesaid at least one vinyl monomer is a compound of the formula:

(a) $CH_2$=$C(R)X$ where R is hydrogen or $C_1$–$C_4$ alkyl and X is phenyl or phenyl substituted with $C_1$–$C_4$ alkyl;

(b) $CH_2$=$C(R)COOR^1$ where R is hydrogen or $C_1$–$C_4$ alkyl and $R^1$ is hydrogen or $C_1$–$C_{10}$ alkyl;

(c) $CH_2$=CHC≡N;

(d) $CH_2$=$CHC(O)NR^2R^3$ where $R^2$ and $R^3$ are hydrogen or $C_1$–$C_4$ alkyl and may be the same or different;

(e) $CH_2$=$CHR^4$ where $R^4$ is halogen, preferably chlorine;

(f) $CH_2$=$C(R)(CH_2)_n COOR^1$ where R is hydrogen or $C_1$–$C_4$ alkyl, $R^1$ is hydrogen or $C_1$–$C_{10}$ alkyl and n is an integer of 1 to 4; or (g) $CH_2$=$CY_2$ where Y is fluorine or chlorine;

In another preferred embodiment, the aforesaid at least one vinyl monomer is at least one compound of the formula:

(a) CH$_2$=CHX where X is chlorine, phenyl, or phenyl substituted with C$_1$–C$_4$ alkyl;

(b) CH$_2$=C(R)COOR$^1$ where R is hydrogen or C$_1$–C$_4$ alkyl and R$^1$ is hydrogen or C$_1$–C$_{10}$ alkyl;

(c) CH$_2$=CHC≡N;

(d) CH$_2$=CHC(O)NR$^2$R$^3$ where R$^2$ and R$^3$ are hydrogen or C$_1$–C$_4$ alkyl and may be the same or different; or (e) CH$_2$=CH—CH=CHZ where Z is hydrogen or C$_1$–C$_4$ alkyl.

In a more preferred embodiment, the aforesaid at least one vinyl monomer is an acrylic acid; an acrylate, such as butyl acrylate or 2-ethylhexyl acrylate; an alkylacrylic acid, such as methacrylic acid; an alkylacrylate, such as methyl methacrylate; a vinyl acid such as vinyl acetic acid; a vinyl nitrile, such as acrylonitrile, styrene, or a styrene derivative; a vinyl halide, such as vinyl chloride, vinyl bromide or vinyl fluoride; or a diene, such as butadiene. Thus, included in the present invention are copolymers of an aforesaid high reactivity polyolefin and one or more vinyl compounds selected from the group consisting of methacrylic acid, methyl methacrylate, butyl acrylate, 2-ethylhexyl acrylate, styrene, butadiene, acrylonitrile, vinyl chloride, and vinylidene chloride.

As employed herein, the term "vinyl monomer" includes vinylidene monomers. The term "vinylidene monomer" refers to compounds of the formula CH$_2$=CY$_2$ where Y is halogen, preferably fluorine or chlorine. Many vinyl and vinylidene monomers that are suitable for use in the present invention include, but are not limited to, those described in Billmeyer, Fred, W., TEXTBOOK OF POLYMER SCIENCE, 3rd Edition, John Wiley & Sons (1984) incorporated herein by reference in its entirety, and particularly those vinyl and vinylidene monomers discussed in Chapters 13 and 14 at pages 361–406 and include methacrylic acids and acrylates, for example C$_1$–C$_{12}$ acrylates such as methyl acrylate, ethyl acrylate, propyl acrylate, butyl acrylate, pentyl acrylate and 2-ethylhexyl acrylate; C$_1$–C$_{20}$ alkyl methacrylates, such as methyl methacrylate, ethyl methacrylate, propyl methacrylate, butyl methacrylate, pentyl methacrylate and hexyl methacrylate; methacrylic acid, styrene (vinylbenzene), vinyl chloride, acrylonitrile, butadiene, vinylacrylonitrile butadiene styrene, acrylates, and styrene acrylonitrile.

High reactivity polyolefins suitable for use in the present invention generally are viscous, low molecular weight polyolefins having a high percentage of vinylidene olefinicity—that is, at least about 40%, preferably at least about 50%, more preferably at least about 60%, and most preferably at least about 80%, and a number average molecular weight of about 200 to about 10,000, preferably about 300 to about 7,500, more preferably about 500 to about 5,000, and most preferably about 500 to about 3,000. The aforesaid high reactivity polyolefins (also referred to as high vinylidene polyolefins or alkylvinylidene polyolefins) are preferably polymers or copolymers of C$_3$–C$_{20}$ olefins or copolymers of ethylene with a C$_3$–C$_{20}$ olefin.

As employed herein, the term "alkylvinylidene" or "alkylvinylidene olefin" refers to olefins and polyalkylene components having the following vinylidene structure

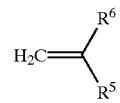

(II)

wherein R$^5$ is an alkyl or substituted alkyl group of sufficient chain length to give the resulting molecule an Mn of about 200 to about 10,000 and R$^6$ is lower alkyl. Thus, R$^5$ generally has at least about 10 carbon atoms, preferably at least about 50 carbon atoms and R$^6$ is lower alkyl of about 1 to about 12 carbon atoms, preferably about 1 to about 6 carbon atoms, and more preferably methyl. Preferably, R$^5$ has about 10 to about 750 carbon atoms, and more preferably R$^5$ has about 20 to about 400 carbon atoms.

The aforesaid high reactivity polyolefins may be prepared according to the process described in Eaton, U.S. Pat. No. 5,068,490, which is incorporated herein by reference in its entirety. This process is especially useful for preparing high reactivity polyisobutylene. In the process disclosed therein, a 1-olefin containing feedstock is contacted with a BF$_3$-tertiary etherate at −100° C. to +50° C. The tertiary ether can have the general formula: (I)

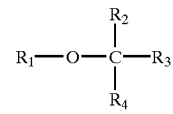

where R$_1$ is C$_1$ to C$_{20}$ hydrocarbyl or halo-substituted hydrocarbyl, and R$_2$, R$_3$ and R$_4$ may be the same or different and are selected from the group consisting of (1) —CH$_2$R' where R' is H, halogen, or C$_1$ to C$_{20}$ hydrocarbyl or halo-substituted C$_1$ to C$_{20}$ hydrocarbyl; (2) —CH=R" where R" is C$_1$ to C$_{20}$ hydrocarbyl or halo-substituted C$_1$ to C$_{20}$ hydrocarbyl; and (3) —C≡R'" where R'" is C$_1$–C$_{20}$ hydrocarbyl or halo-substituted hydrocarbyl. Preferred tertiary ethers for use in preparation of the BF$_3$-etherate complexes are those in which and R$_2$, R$_3$ and R$_4$ in the above formula are methyl, and R$_1$ is C$_1$ to C$_{10}$ hydrocarbyl. Particularly preferred are the alkyl tert-butyl ethers, for example, methyl t-butyl ether, n-butyl t-butyl ether; isopropyl t-butyl ether, di-tert-butyl ether, ethyl tert-butyl ether; pentyl tert-butyl ether; 1,1'-dimethylbutyl methylether, etc.

The aforesaid high reactivity polyolefins, (also referred to as high vinylidene polyolefins or alkylvinylidene polyolefins) are preferably polymers and copolymers of C$_3$–C$_{20}$ olefins or copolymers of ethylene with a C$_3$–C$_{20}$ olefin.

The aforesaid high reactivity polyolefins which can be used to prepare the copolymers of the present invention also include reactive, low molecular weight, viscous, essentially 1-olefin-containing poly(1-olefins) and copoly(1-olefins) that can be prepared employing a catalyst comprising a Periodic Group IVb metallocene and an aluminoxane and/or boron containing cocatalyst from a feedstock containing one or more C$_3$ to C$_{20}$ 1-olefins. Such reactive, low molecular weight, viscous, essentially 1-olefin-containing poly(1-olefins) and copoly(1-olefins) and their method of preparation are described in Bagheri et al., U.S. Pat. No. 5,688,887, issued Nov. 18, 1997, and WO 93/24539, each of which is incorporated herein by reference in its entirety. Suitable essentially terminally-unsaturated, viscous, essentially-1-olefin-containing poly(1-olefins) or copoly(1-olefins) may be made by a process which comprises polymerizing under fluid phase conditions, preferably liquid phase conditions, a feedstock comprising more than 1 weight percent of at least one volatile hydrocarbon liquid and less than 99 weight percent based on total feedstock of one or more $C_3$ to $C_{20}$-olefins using a catalyst system comprising a titanium (IV), zirconium(IV), or hafnium(IV) metallocene and an aluminoxane cocatalyst to form a poly(1-olefin) or copoly (1-olefin) having a number average molecular weight in a range from about 300 to about 10,000, more preferably between about 300 and about 5000, and most preferably about 400 to about 3000, and terminal vinylidene content typically of more than 80%. Catalyst systems using a bis(cyclopentadienyl) or bis(indenyl) titanium(IV), zirconium(IV), or hafnium(IV) compound are preferred, particularly bis(cyclopentadienyl)-zirconium dichloride ($CP_2ZrCl_2$) or bis(indenyl) zirconium dichloride ($In_2ZrCl_2$). The resulting polymers are atactic. By essentially terminally-unsaturated is meant that preferably more than about 90%, more preferably more than about 95%, and most preferably more than about 99% of the polymer chains in the product polymer contain terminal unsaturation. The terminal unsaturation is preferably more than about 80%, more preferably more than about 90%, and most preferably more than about 95% of the vinylidene type. Such copolymers may also include copolymers of a 1-olefin and an alpha-omega diene. Such alpha-omega dienes may include, but are not limited to, 7-methyl-1,6-octadiene. These terminally unsaturated, viscous polymers are essentially poly(1-olefins) or copoly(1-olefins). By essentially poly(1-olefins) or copoly(1-olefins) is meant more than about a 95% and, more preferably, more than about a 98% 1-olefin content in the polymer chains except where, for example, an alpha-omega diene is added as described above.

Isobutene polymers that are suitable for use as the aforesaid high reactivity polyolefin in making the copolymers of the present invention also include those described in U.S. Pat. No. 4,152,499, incorporated herein by reference in its entirety, which are obtained by polymerizing isobutene with boron trifluoride as the initiator. Cocatalysts such as water or alcohols may be used in the polymerization.

High reactivity polyolefins suitable for use in preparing the copolymers of the present invention also include terminally unsaturated ethylene alpha-olefin polymers wherein the terminal unsaturation comprises ethenylidene (i.e., vinylidene) unsaturation as disclosed in U.S. Pat. No. 4,668, 834, U.S. Pat. No. 5,225,092, U.S. Pat. No. 5,225,091, U.S. Pat. No. 5,229,022, U.S. Pat. No. 5,084,534, and U.S. Pat. No. 5,324,800, the disclosures of all of which are hereby incorporated by reference in their entirety. Such polymers are polymers of ethylene and at least one alpha-olefin having the formula $H_2C=CHR$, wherein $R_1$ is a straight chain or branched chain alkyl radical comprising 1 to 18 carbon atoms and wherein the polymer contains a high degree of terminal ethenylidene unsaturation. Preferably $R_1$ in the above formula is alkyl of from 1 to 8 carbon atoms, and more preferably is alkyl of from 1 to 2 carbon atoms. Such alpha-olefins include propylene, 1-butene, hexene-1, octene-1, 4-methylpentene-1, decene-1, dodecene-1, tridecene-1, tetradecene-1, hexadecene-1, heptadecene-1, octadecene-1, and mixtures thereof (e.g., mixtures of propylene and 1-butene, and the like). Exemplary of such polymers are ethylene-propylene copolymers, ethylene-butene-1 copolymers and the like. The molar ethylene content of the ethylene alpha-olefin polymers is preferably in the range of between about 20 and about 80 percent, and more preferably between about 30 and about 70 percent. When propylene and/or butene-1 are employed as comonomer(s) with ethylene, the ethylene content of such copolymers is most preferably between about 45 and about 65 percent, although higher or lower ethylene contents may be present.

The ethylene alpha-olefin polymers generally possess a number average molecular weight of from about 300 to about 10,000 (e.g. from 300 to 10,000) preferably from about 900 to 10,000; more preferably of from about 900 to 10,000 (e.g., from about 700 to about 10,000); from about 1500 to about 5,000. Such ethylene alpha-olefin polymers having a number average molecular weight within the range of from about 700 to about 5000 (e.g., 1500 to 3,000) are particularly useful in the present invention. Such polymers generally possess an intrinsic viscosity (as measured in tetralin at 135° C.) of between about 0.025 and about 0.9 dl/g, preferably of between about 0.05 and about 0.5 dl/g, most preferably of between about 0.075 and about 0.4 dl/g. These polymers preferably exhibit a degree of crystallinity such that, when grafted, they are essentially amorphous. These ethylene alpha-olefin polymers are further characterized in that at least about 95% of the polymer chains possess terminal ethenylidene-type unsaturation. Thus, one end of such ethylene alpha-olefin polymers will be of the formula POLY-$C(T^1)=CH_2$ wherein $T^1$ is $C_1$ to $C_{18}$, alkyl, preferably $C_1$ to $C_8$ alkyl, and more preferably $C_1$ to $C_2$ alkyl, (e.g., methyl or ethyl), and wherein POLY represents the polymer chain. The chain length of the $T^1$ alkyl group will vary depending on the comonomer(s) selected for use in the polymerization. A minor amount of the ethylene alpha-olefin polymer chains can contain terminal ethenyl unsaturation, i.e., POLY—$CH=CH_2$, and a portion of the polymers can contain internal monounsaturation, e.g. POLY—CH=CH ($T^1$), wherein $T^1$ is as defined above. The ethylene alpha-olefin polymers comprise polymer chains, at least about 40 percent of which possess terminal ethenylidene unsaturation. Preferably at least about 50 percent, more preferably at least about 60 percent, and most preferably at least about 75 percent (for example, 75–98%), of such polymer chains exhibit terminal ethenylidene unsaturation. The percentage of polymer chains exhibiting terminal ethenylidene unsaturation may be determined by FTIR spectroscopic analysis titration, or $C^{13}NMR$.

The ethylene alpha-olefin polymers may be prepared as described in U.S. Pat. No. 4,668,834, U.S. Pat. No. 5,225, 092, U.S. Pat. No. 5,225,091, U.S. Pat. No. 5,229,022, U.S. Pat. No. 5,324,800, U.S. Pat. No. 5,094,534, and European Patent Publications 128,045 and 129,368, the disclosures of all of which are hereby incorporated by reference in their entirety. The ethylene alpha-olefin polymers can be prepared by polymerizing monomer mixtures comprising ethylene in combination with other monomers such as alpha-olefins having from 3 to 20 carbon atoms (and preferably from 3 to 4 carbon atoms, that is, propylene, butene-1, and mixtures thereof) in the presence of a catalyst system comprising at least one metallocene (for example, a cyclopentadienyl-transition metal compound) and an alumoxane compound. The comonomer content of the ethylene alpha-olefin polymers can be controlled through the selection of the metallocene catalyst component and by controlling the partial pressure of the various monomers.

The catalysts employed in the production of the ethylene alpha-olefin polymers are organometallic coordination compounds which are cyclopentadienyl derivatives of a Group IVb metal of the Periodic Table of the Elements(56th Edition of Handbook of Chemistry and Physics, CRC Press[1975]) and include mono, di, and tricyclopentadienyls and their derivatives of the transition metals. Particularly desirable are the metallocene of a Group IVb metal such as titanium, zirconium, and hafnium. The alumoxanes employed in forming the reaction product with the metallocenes are themselves the reaction products of an aluminum trialkyl with water. In general, at least one metallocene compound is employed in the formation of the catalyst. Metallocene is a metal derivative of a cyclopentadiene. The metallocenes used to make the ethylene alpha-olefin polymers contain at least one cyclopentadiene ring. The metal is selected from the Group IVb, preferably titanium, zirconium, and hafnium, and most preferably hafnium and zirconium. The cyclopentadienyl ring can be unsubstituted or contain one or more substituents (e.g., from 1 to 5 substituents) such as, for example, a hydrocarbyl substituent (e.g., up to 5 C1 to C5 hydrocarbyl substituents) or other substituents, such as, for example, a trialkyl silyl substituent. The metallocene can contain one, two, or three cyclopentadienyl rings; however, two rings are preferred.

The alumoxane compounds useful in the polymerization process may be cyclic or linear. Cyclic alumoxanes may be represented by the general formula (R—Al—O), while linear alumoxanes may be represented by the general formula $R(R-AL-O)_n'AlR_2$. In the general formula R is a $C_1-C_5$ alkyl group such as, for example, methyl, ethyl, propyl, butyl, and pentyl, n is an integer of from 3 to 20, and n' is an integer from 1 to about 20. Preferably, R is methyl and n and n' are 4–18. Generally, in the preparation of alumoxanes from, for example, aluminum trimethyl and water, a mixture of the linear and cyclic compounds is obtained. Polymerization is generally conducted at temperatures ranging between about 20° C. and about 300° C., preferably between about 30° C. and 200° C. Reaction time is not critical and may vary from several hours or more to several minutes or less, depending upon factors such as reaction temperature, the monomers to be copolymerized, and the like. One of ordinary skill in the art may readily obtain the optimum reaction time for a given set of reaction parameters by routine experimentation. Polymerization pressures are preferably from about 10 to about 3,000 bar, and generally at a pressure within the range from about 40 bar to about 3,000 bar; and most preferably, the polymerization will be completed at a pressure within the range from about 50 bar to about 1,500 bar. The polymerization may be conducted employing liquid monomer, such as liquid propylene, or mixtures of liquid monomers (such as mixtures of liquid propylene and 1-butene), as the reaction medium. Alternatively, polymerization may be accomplished in the presence of a hydrocarbon inert to the polymerization such as butane, pentane, isopentane, hexane, isooctane, decane, toluene, xylene, and the like. In those situations wherein the molecular weight of the polymer product that would be produced at a given set of operating conditions is higher than desired, any of the techniques known in the prior art for control of molecular weight, such as the use of hydrogen and/or polymerization temperature control, may be used in the process for preparing the polymers.

The copolymers of the present invention are prepared in accordance with the method of the present invention by reacting an aforesaid highly reactive polyolefin with an aforesaid vinyl monomer in the presence of a free radical initiator and under polymerization conditions. Since the resulting copolymers of the present invention are generally mixtures, they will generally contain a mixture of individual molecules and polyalkyl groups of varying molecular weight. Also, mixtures of copolymer molecules having different degrees of polymerization will be produced. In general, the molecular weight of copolymers of the present invention ranges from about 80,000 to about 1,500,000, preferably from about 300,000 to about 1,000,000.

The preferred alkylvinylidene isomer of the aforesaid highly reactive polyolefin employed in the method of this invention comprises a methyl- or ethylvinylidene isomer, more preferably the methylvinylidene isomer. The especially preferred high reactivity polyolefins used to prepare the copolymers of the present invention are polyisobutenes which comprise at least about 60% of the more reactive methylvinylidene isomer, preferably at least about 80%, and more preferably at least about 95%. Suitable polyisobutenes include those prepared using $BF_3$ catalysis. The preparation of such polyisobutenes in which the methylvinylidene isomer comprises a high percentage of the total composition is described in U.S. Pat. Nos. 4,152,499 and 4,605,808 incorporated herein by reference. By contrast, polyisobutenes and polyolefins produced by conventional $AlCl_3$ catalysis, when reacted with the vinyl monomers used in the present invention in the presence of a free radical initiator, do not have sufficient terminal vinylidene content to produce copolymers having the improved properties associated with copolymers of the present invention and do not produce a copolymeric product.

For some vinyl monomers, the reaction may be conducted neat, that is, both the high reactivity polyolefin, and the vinyl monomer (or vinyl monomers) and the free radical initiator are combined in the proper ratio, and then stirred at the reaction temperature. Alternatively, the reaction may be conducted in a diluent. For example, the reactants may be combined in a solvent. Suitable solvents include those in which the reactants and free radical initiator are soluble or dispersible and include water, acetone, tetrahydrofuran, chloroform, methylene chloride, dichloroethane, toluene, dioxane, chlorobenzene, xylenes, or the like. After the reaction is complete, volatile components may be stripped off. When a diluent is employed, it is preferably inert to the reactants and products formed and is generally used in an amount sufficient to ensure efficient stirring.

In general, the copolymerization method of this invention can be initiated by any free radical initiator. Such initiators are well known in the art. However, the choice of free radical initiator may be influenced by the solvent or reaction temperature employed. The preferred free-radical initiators for copolymerization in emulsion or suspension polymerization are the persulfate-type polymerization initiators. Preferred persulfates include ammonium persulfate, sodium persulfate, potassium persulfate, and lithium persulfate. Ammonium persulfate is particularly preferred. Other free-radical initiators which can be used are the peroxide-type polymerization initiators and the azo-type polymerization initiators. Radiation can also be used as the initiator to initiate the reaction, if desired.

The peroxide-type free-radical initiator can be organic or inorganic, the organic having the general formula: R'OOR" where R' is any organic radical and R" is selected from the group consisting of hydrogen and any organic radical. Both R' and R" can be organic radicals, preferably hydrocarbon, aroyl, and acyl radicals, carrying, if desired, substituents such as halogens, etc. Preferred peroxides include di-tert-butyl peroxide, tert-butyl peroxybenzoate, and dicumyl peroxide. Examples of other suitable peroxides, which in no way are limiting, include benzoyl peroxide; lauroyl peroxide; other tertiary butyl peroxides; 2,4-dichlorobenzoyl peroxide; tertiary butyl hydroperoxide; cumene hydroperoxide; diacetyl peroxide; acetyl hydroperoxide; diethylperoxycarbonate; tertiary butyl perbenzoate; and the like.

The azo-type compounds, typified by alpha,alpha'-azobisisobutyronitrile, are also well-known free-radical promoting materials. These azo compounds can be defined as those having present in the molecule the group —N=N wherein the balances are satisfied by organic radicals, at least one of which is preferably attached to a tertiary carbon. Other suitable azo compounds include, but are not limited to, p-bromobenzenediazonium fluoroborate; p-tolyidiazoaminobenzene; p-bromobenzenediazonium hydroxide; azomethane and phenyldiazonium halides. A suitable list of azo-type compounds can be found in U.S. Pat. No. 2,551,813, incorporated herein by reference in its entirety.

The amount of initiator to employ, exclusive of radiation, depends to a large extent on the particular initiator chosen, the high reactivity olefin used and the reaction conditions. The usual concentrations of initiator are between 0.001 and 0.2 mole of initiator per mole of vinyl monomer reactant with preferred amounts between 0.005 and 0.10 mole of initiator per mole of vinyl monomer reactant.

Typically the reaction may be conducted at a temperature of about 30° C. to about 350° C., preferably from about 40° C. to about 300° C. However, the polymerization temperature must be sufficiently high to break down the initiator to produce the desired free-radicals. For example, using persulfate initiators, such as ammonium persulfate as the initiator, a polymerization temperature of at least about 40° C., preferably about 40° C. to about 120° C., more preferably about 50° C. to about 100° C. and still more preferably, about 60° C. to about 90° C. can be used. Using benzoyl peroxide as the initiator, the reaction temperature can be between about 75° C. and about 90° C., preferably between about 80° C. and about 85° C. Higher and lower temperatures can be employed, a suitable broad range of temperatures being between about 20° C. and about 200° C., with preferred temperatures between about 50° C. and about 150° C.

The reaction pressure should be sufficient to maintain the solvent in the liquid phase. Pressures can therefore vary between about atmospheric and 100 psig or higher, but the preferred pressure is atmospheric. The reaction time is usually sufficient to result in the substantial conversion of the vinyl monomer reactant and high reactivity polyolefin to copolymer of the invention having the desired properties. The reaction time is generally between one and 24 hours, with preferred reaction times between two and ten hours.

The subject reaction can be an emulsion-type polymerization reaction, a solution-type polymerization reaction, a suspension-type polymerization reaction, a bulk-type polymerization reaction or a precipitation-type polymerization reaction. The high reactivity polyolefin, vinyl monomer reactant, solvent and initiator can be brought together in any suitable manner. The important factors are intimate contact of the high reactivity polyolefin and vinyl monomer reactant in the presence of a free-radical producing material.

For example, the components in the reaction mixture can be added continuously to a stirred reactor with continuous removal of a portion of the product to a recovery train or to other reactors in series. The reaction can also be conducted in a batch system where all of the high reactivity polyolefin is added initially to a mixture of vinyl monomer reactant, initiator and solvent, or the high reactivity polyolefin can be added intermittently or continuously to the reaction pot. Alternatively, the reactants may be combined in other orders; for example, vinyl monomer reactant and initiator may be added to high reactivity polyolefin and solvent in the reaction pot. The reaction can also suitably take place in a coil-type reactor where the components are added at one or more points along the coil.

In one envisioned embodiment, the reaction product of a vinyl monomer reactant and a high vinylidene-containing polyolefin is further reacted thermally. In this embodiment, any unreacted polyolefin, generally the more hindered olefins, i.e., the non-vinylidene polyolefins, that do not react readily with the vinyl monomer reactant under free radical conditions, are reacted with vinyl monomer reactant under thermal conditions, i.e., at temperatures of about 40° C. to 300° C.

The reaction solvent, as noted above, must be one which dissolves the initiator. Suitable solvents include water, liquid saturated or aromatic hydrocarbons having from six to twenty carbon atoms; ketones having from three to six carbon atoms; and liquid saturated aliphatic dihalogenated hydrocarbons having from one to five carbon atoms per molecule, preferably from one to three carbon atoms per molecule. By "liquid" is meant liquid under the conditions of polymerization. In the dihalogenated hydrocarbons, the halogens are preferably on adjacent carbon atoms. By "halogen" is meant fluorine, chlorine and bromine.

Examples of suitable solvents include, but are not limited to: water, ketones, such as acetone; methylethylketone; diethylketone; and methylisobutyl-ketone; aromatic hydrocarbons, such as benzene; xylene; and toluene; saturated dihalogenated hydrocarbons, such as: dichloromethane; dibromo-methane; 1-bromo-2-chloroethane; 1,1-dibromoethane; 1,1-dichloroethane; 1,2-dichloroethane; 1,3-dibromopropane; 1,2-dibromopropane; 1,2-dibromo-2-methylpropane; 1,2-dichloropropane; 1,1-dichloropropane; 1,3-dichloro-propane; 1-bromo-2-chloropropane; 1,2-dichlorobutane; 1,5-dibromopentane; and 1,5-dichloropentane; or mixtures of the above, such as benzene-methylethylketone.

If necessary, after the polymerization reaction has proceeded to the desired extent, the copolymer is conveniently separated from solvent and unreacted reactants by conventional procedures such as phase separation, solvent distillation, precipitation and the like. If desired, dispersing agents and/or cosolvents can be used during the reaction.

The resulting graft copolymers of the present invention can be used for the same applications as polymers and copolymers of the particular vinyl monomer or monomers used or the vinylidene monomer or monomers used. Such graft copolymers have improved impact strength and flexibility. For example, a copolymer of styrene and high reactivity polybutene having improved flexibility and impact resistance may find use in the same applications as currently available polystyrene. Use of free radical polymerization to incorporate polyolefins into vinyl and/or vinylidene polymers provides a means of imparting the beneficial qualities provided by the polyolefin by actually chemically incorporating it into the copolymer. It overcomes the problems associated with attempts to improve properties of vinyl polymers by physically incorporating polyolefins through mixing or blending. For example, when polybutene is physically blended into polystyrene, one can only get up to about 3% of polybutene into the polystyrene, and the result is just a physical mixture; the polybutene is not chemically incorporated into the polystyrene to form a copolymer as it is in the present invention. Furthermore, chemical incorporation of a given amount of the aforesaid highly reactive polyolefin into a polymer derived from the aforesaid vinyl and vinylidene monomer affords a greater improvement in the properties of the polymer derived from the vinyl or vinylidene monomer than does physical incorporation thereunto of even the same amount of the aforesaid highly reactive polyolefin.

The present invention also includes compositions containing a copolymer of the present invention and useful in coating, adhesive, paint, structural, film, sheet pipe, toy, house siding, asphalt, thermoplastic and elastomer applications. The present invention also includes a coating composition containing a copolymer of the present invention. The present invention is also a multilayer structure comprising at least one substrate coated with at least one layer of a coating comprising a copolymer of the present invention. The substrate may be any material capable of being coated with a copolymer of the invention or a coating composition containing a copolymer of the invention. Such substrates may include, but are not limited to metal, wood, concrete, plastic, paper, textiles, polymers, glass, fiberboard, composites, fibers porcelain, polymers films and sheets, and the like.

Some copolymers of the present invention, especially those made using acrylate or methacrylate monomers, have the advantage that they can be incorporated into coating formulations without the use of volatile organic compounds (VOCs). VOCs are not used or are reduced in the production of some compositions containing copolymers of the invention, for example, certain coatings, adhesives, paint formulations, and other products incorporating the copolymers. These compositions incorporating copolymers of the present invention are advantageous because they do not contain volatile organic compounds (VOCs). Since they can be made without using volatile organic compounds, costs are reduced as VOCs do not have to be purchased and disposed of, and any environmental problems, toxicity problems or special handling or disposal requirements associated with the use of VOCs are eliminated. Copolymers of the present invention may also have the advantages of demonstrating improved water absorption resistance, improved hardness characteristics, improved flexibility, and improved processability.

Thus, incorporating high reactivity polyolefins into polymers derived from vinyl and vinylidene monomers has many advantages, depending on the monomers chosen, including improving impact strength, melt flow, transparency, processing speed, chemical and water resistance, density, compatibility, flexibility, plasticization, toxicity, mildew resistance, environmental stress crack resistance (ESCR), and flexibility/strength.

For example, a copolymer of styrene-acrylonitrile (SAN), acrylonitrile-butadiene-styrene (ABS), or styrene-butadiene-rubber (SBR) with high reactivity polyisobutylene has improved impact strength, melt flow, processing speed, transparency, chemical resistance, density, and compatibility, and finds use in office equipment, automobile and other applications.

The acrylate and alkylacrylate copolymers of the present invention can be incorporated into water based coatings to improve water resistance and hardness characteristics. They can also be incorporated into paints and adhesives.

In general, the copolymers of the present invention find use in the same applications for which polymers of the vinyl and vinylidene monomers are used. Such applications are described in Concise Encyclopedia of Polymer Science and Engineering, Jacqueline I. Kroschwitz, Executive Editor, John Wiley and Sons, New York, 1990, incorporated herein by reference in its entirety; Encyclopedia of Polymer Science and Engineering, Second Edition, Editors Herman F. Mark, Norbert M. Bikales, Charles G. Overberger, George Menges, and Jacqueline I. Kroschwitz, John Wiley and Sons, New York, 1985, incorporated herein by reference in its entirety; Kirk-Othmer Encyclopedia of Chemical Technology, 3rd edition (1994) incorporated herein by reference in its entirety, and Kirk-Othmer Encyclopedia of Chemical Technology, 4th edition (1994) incorporated herein by reference in its entirety.

A copolymer of polyvinyl chloride (PVC) with high reactivity polyisobutylene has improved flexibility; plasticization; impact resistance, density; melt flow; toxicity; and mildew resistance; and finds use in film applications, sheet applications, pipe applications, toy applications, structural applications; house/building siding applications; and internal lubricant applications. For example, dioctyl phthalate (DOP) which has toxicity problems, is used to add flexibility to polyvinyl chloride. Incorporating high reactivity polybutene or other high reactivity polyolefins into PVC using free radical polymerization provides copolymers which have improved flexibility without the use of DOP. Such copolymers find use in all the applications for which PVC is currently used. Such applications include, but are not limited to, those described in Concise Encyclopedia of Polymer Science and Engineering (1990) p. 1246–1254 incorporated herein by reference in its entirety. For example, PVC-containing copolymers of the present invention find use in pipe fittings, electrical and equipment housing, bottles, footwear, novelties, components, flooring, packaging sheet, film and foil, decorative laminates, thermoforming sheet, rigid sheet, sheet and foil swimming pool liners, waterproof membranes, toys, pipe: pressure, water, irrigation, drain/vent/waste, conduit, sewer/drain; profiles: GP profiles, window profile, composite windows, siding/cladding, drawer components, curtain rails; sheet and foils, foam sheet, pipe, and profile; hoses, tubes, film, cables, belting, waterstops and seals, and trim.

As another example, a copolymer of polystyrene with high reactivity polyisobutylene or another high reactivity polyolefin has improved impact resistance; environmental stress crack resistance (ESCR); chemical resistance; melt flow; transparency; density; and flexibility/strength; and finds use in asphalt applications; thermoplastic applications; and elastomer applications as well as in all the applications for which polystyrene is currently used. For example, copolymers of the present invention which incorporate styrene find use in packaging, appliances, construction, automotive parts, toys, housewares, luggage, medical ware, disposable food service, and electronic equipment. When fabricated using injection molding, such styrene copolymers find use in furniture, toys, radio and television cabinets, automotive parts, medical ware, housewares, bottle caps, containers, and the like. When fabricated using blow molding, such styrene copolymers find use in bottles, containers, furniture, automotive parts, and the like. When fabricated using extrusion, such styrene copolymers find use in film (including multilayer and oriented), profiles, light diffusers, wall covering, and the like. When fabricated using extrusion and thermoforming, such styrene copolymers find use in refrigerator and freezer parts, luggage, food containers (both solid and formed), disposable cups and dinnerware, large automotive parts, and the like. Foam applications include egg cartons, meat-packaging trays, building insulation, "clamshells" for fast-food packaging, and expanded polystyrene cushioning materials for packaging. Applications for which styrene-derived copolymers of the present invention are used include, but are not limited to, those given for polystyrene in the section on "Styrene Polymers" in Concise Encyclopedia of Polymer Science and Engineering (1990) p. 1114–1140, incorporated herein by reference in its entirety.

Copolymers of high reactivity polyolefins and acrylonitrile-butadiene-styrene (ABS) find use in all the applications for which ABS is currently used. Applications for which ABS-derived copolymers of the present invention are used include those given for ABS in Concise Encyclopedia of Polymer Science and Engineering (1990) p. 25–27, incorporated herein by reference in its entirety. Such applications include, but are not limited to, use in appliances, in refrigerator doors, in tank liners, in automobiles and automotive applications, e.g., instrument panels, light consoles, pillar post moldings, and other interior trim parts, knobs, light bezels, mirror housings, decorative trim, and grills; use in building and construction, e.g., in pipe, fittings, and conduit. Other uses include use in business machines, telephones, consumer electronics, modifiers, luggage, packaging, and furniture.

Applications for which copolymers of the present invention derived from free radical polymerization of acrylic and methacrylic acids with high reactivity polyolefins are used include those given for acrylic and methacrylic acids and esters in the Encyclopedia of Polymer Science and Engineering, 2nd edition (1985) p. 221–231, incorporated herein by reference in its entirety. Such applications include, but are not limited to use as thickeners, e.g. for rubber, and other latexes, in petroleum recovery, in toothpaste, cosmetics, hydraulic fluids, and liquid rocket fuels; as ion-exchange resins; as suspending agents and dispersants, e.g., additives in drilling mud, pigment dispersants in paint or other colorant manufacture, with starch based paper-size formations, to improve the dispersion of cement in water and as cement additives; as flocculating agents, e.g. in treatment of potable and waste water, clarification of sugar cane juice, recovery of suspended metal ores in mining operations, clarification of used dry-cleaning fluids, in improving tilth and modifying water-holding capacity of clay soils; as binders, e.g., in ceramics, foundry core binder, and dental cements; as adhesives and in adhesive compositions; and in safety glass interlayers and in glass fiber plastic composites.

Applications for which copolymers of the present invention derived from free radical polymerization of acrylic and methacrylic esters with high reactivity polyolefins are used include, but are not limited to, those given for acrylic and methacrylic acids and esters in Encyclopedia of Polymer Science and Engineering, 2nd edition (1985) p.278–290, incorporated herein by reference in its entirety. Such uses include coatings, e.g. in paint formulations, surface finishes, e.g. prefinishing of wood, acrylic emulsions used in conjunction with nitrocellulose to provide clear industrial finishes, in aqueous latex-based maintenance paints; in textile finishing, e.g., as thickeners in the formulation of textile finishes; as temporary protective coatings applied to warp or single-end sizes; acrylic based emulsion polymers are used as permanent coatings for fabrics, to reduce shrinkage of wool, to improve abrasion resistance of textiles; to bond nonwoven fabrics, to bind pigments, as heat seal adhesives; and as a carpet-backing size; water-soluble acrylic based polymers are incorporated into carpet shampoo to impart soil retardancy; certain acrylic polymers find use as textile sizes, binders for glass fibers, in printing ink formulations for textiles; in textile backings, e.g., acrylic latex foams find use as backing for drapery or other fabric; as paper saturants and in paper coatings; as lubricating oil additives; for leather finishing and as acrylic polymer leather composites; as modifiers for cement impact strength and adhesion; as temporary binders, deflocculants, and additive components in ceramic bodies and glazes; as binders for aqueous and solvent-based caulks and sealants; in roof mastics; as processing aids and plate-out scavengers for both plasticized and unplasticized poly(vinyl chloride) in the manufacture of blown film and thin-gauge calendered film; in acrylic floor polishes; as coatings for plant leaves to help in controlling plant disease; in heat resistant seals; in glazing materials; in architectural applications such as domes over pools, archways, windows, as window mosaics, side glazing, patterned windows, color-coordinated structures and for solar control in sunscreens; biomedical applications include use in construction of custom appliances, dentures, teeth, denture bases and filling materials, as pit-and fissure resin sealants, high binder-strength dental and surgical bindings and filling agents, in bone cement, in contact lenses; in optical applications, such as light focusing plastic fibers, optical fibers, and lenses. Other applications include use in cultured marble plastic fixtures, thermoformed bathtubs, in toys, to improve water resistance of slate, in anion-exchange fibers and films; and opaque and clear methacrylate derived copolymer sheet find use in the construction of recreational vehicles.

Applications for which copolymers of the present invention derived from free radical polymerization of styrene and acrylonitrile with high reactivity polyolefins are used include, but are not limited to, those given for styrene-acrylonitrile (SAN) copolymers in Encyclopedia of Polymer Science and Engineering, 2nd edition (1985) p.452–464, incorporated herein by reference in its entirety. Such SAN derived copolymers find use in appliances, e.g., air-conditioner and other appliance parts, decorated escutcheons, washer and dryer instrument panels, washing-machine filter bowls, detergent dispensers, refrigerator shelves and crisper pans, blenders, mixers, lenses, knobs, and covers; in housewares, e.g., brush blocks and handles, broom and brush bristles, cocktail glasses, disposable dining utensils, hangers, ice buckets, jars, mugs, carafes, bowls, soap containers, tumblers, and food trays; in packaging materials, e.g. bottles, jars, vials, closures, containers, display boxes, and films; in automotive applications, e.g., batteries, bezels, lenses, signals, dash components, and interior trim; in industrial applications; e.g., batteries, transmitter caps, business machines, instrument covers, tape and data reels, medical apparatus and equipment such as syringes, blood aspirators, petri dishes, cell culture bottles, artificial kidney devices; in custom molding products, e.g., aerosol nozzles, bottle sprayers, camera parts, dentures, pen and pencil barrels, sporting goods, toys, telephone parts, filter bowls, tape dispensers, and terminal boxes; in concrete composites; and in electrical/electronics components.

Applications for which copolymers of the present invention derived from free radical polymerization of a vinyl ester such as vinyl acetate and at least one aforesaid vinyl monomer with a high reactivity polyolefin are used include, but are not limited to, those given for vinyl ester polymers in Encyclopedia of Polymer Science and Engineering, 2nd edition (1985) p.406–422, incorporated herein by reference in its entirety. Such uses include use in adhesives and adhesive films such as emulsion films and plasticized films; in coatings and paints; in paper and paperboard coatings; in textile finishes; in binding agents for nonwoven fabrics; as antishrink agents for glass-fiber-reinforced polyester molding resins; as binders for fibers, leather, asbestos, sawdust, sand, clay, and other materials to form compositions that can be shaped with heat and pressure; in concrete, joint cements, taping compounds, caulks and fillers; in light-sensitive stencil screens for textile printing and ceramic decoration; in printing inks, lacquers, and high gloss coatings; as chewing-gum bases; in controlled release agents for administration of drugs and other chemicals; and as a base for antifouling marine paints.

The present invention also includes a copolymer of (a) at least one vinyl monomer of the formula $CH_2=C(R)OC(O)R^3$ where $R^3$ is $C_1$–$C_4$ alkyl; (b) at least one vinyl monomer having the formula $CH_2=C(R)X$ where R is hydrogen or $C_1-C_6$ alkyl, and X is halogen, phenyl or phenyl substituted with $C_1-C_4$ alkyl, $—COOR^1$ where $R^1$ is hydrogen or $C_1-C_{12}$ alkyl, $—C\equiv N$, $—C(O)NR^2R^3$ where $R^2$ and $R^3$ are hydrogen or $C_1-C_4$ alkyl and may be the same or different, $—(CH_2)_nCOOR^1$ where $R^1$ is hydrogen or $C_1-C_{12}$ alkyl and n is an integer of from 1 to 4, or $—CH=CHZ$ where Z is hydrogen or $C_1-C_8$ alkyl; or where both R and X are halogen, and (c) at least one high reactivity polyolefin having a terminal vinylidene content of at least about 40% and a number average molecular weight of about 200 to about 10,000. Preferably, the vinyl monomer of the formula $CH_2=C(R)OC(O)R^3$ is vinyl acetate. Preferably, the vinyl monomer of the formula $CH_2=C(R)X$ is a compound of the formula: $CH_2=CHX$ where X is chlorine, phenyl, or phenyl substituted with $C_1-C_4$ alkyl; $CH_2=C(R)COOR^1$ where R is hydrogen or $C_1-C_4$ alkyl and $R^1$ is hydrogen or $C_1-C_{10}$ alkyl; $CH_2=CHC\equiv N$; $CH_2=CHC(O)NR^2R^3$ where $R^2$ and $R^3$ are hydrogen or $C_1-C_4$ alkyl and may be the same or different; $CH_2=C(R)(CH_2)_nCOOR^1$ where R is hydrogen or $C_1-C_4$ alkyl, $R^1$ is hydrogen or $C_1-C_{10}$ alkyl and n is an integer of from 1 to 4; or $CH_2=CH—CH=CHZ$ where Z is hydrogen or $C_1-C_4$ alkyl. In an alternative preferred embodiment, the vinyl monomer of the formula $CH_2=C(R)X$ is a compound of the formula: $CH_2=C(R)X$ where R is hydrogen or $C_1-C_4$ alkyl and X is phenyl or phenyl substituted with $C_1-C_4$ alkyl; $CH_2=C(R)COOR^1$ where R is hydrogen or $C_1-C_4$ alkyl and $R^1$ is hydrogen or $C_1-C_{10}$ alkyl; $CH_2=CHC\equiv N$; $CH_2=CHC(O)NR^2R^3$ where $R^2$ and $R^3$ are each hydrogen or $C_1-C_4$ alkyl and may be the same or different; $CH_2=CHR^4$ where $R^4$ is halogen, preferably chlorine; $CH_2=C(R)(CH_2)_nCOOR^1$ where R is hydrogen or $C_1-C_4$ alkyl, $R^1$ is hydrogen or $C_1-C_{10}$ alkyl and n is an integer of from 1 to 4; or $CH_2=CY_2$ where Y is fluorine or chlorine.

Polyvinyl acetate-containing copolymers of the present invention are converted to poly(vinyl alcohol)-containing copolymers by hydrolysis or catalyzed alcoholysis. Applications for such copolymers of vinyl alcohols and high reactivity polyolefins of the present invention include, but are not limited to, those given for vinyl alcohol polymers in Encyclopedia of Polymer Science and Engineering, 2nd edition (1985) p.183–193, incorporated herein by reference in its entirety. Such uses include use in textiles and warp sizing, in adhesives, polymerization stabilizers, in building products, e.g., in cement coatings and finishes, dry-wall joint cements, stucco finishes, thin bed tile mortars, cement paint, roof coatings and cement toppings for repairs; as fibers, films, protective coatings, e.g., for metals, plastics, and ceramics, in photoengraving, photogravure, screen printing, printed-circuit manufacture, and color television tube manufacture; in cosmetic applications; as a viscosity builder for aqueous solutions or dispersions, and in paper and paperboard coatings.

Polyvinyl alcohol-containing copolymers of the present invention can be converted to poly(vinyl acetal)— containing copolymers of the present invention by condensation with an aldehyde in the presence of an acid catalyst. Poly(vinyl butyral)-containing copolymers of the invention find use in applications for which poly(vinyl butyral) is used, for example, as an interlayer in automotive and aircraft safety glazings, in safety glass. Lower poly(vinyl acetal)-containing copolymers of the present invention such as those containing poly(vinyl formal) find use in enamels for coating electrical wire and in self-sealing gasoline tanks.

The following examples will serve to illustrate certain embodiments of the invention disclosed herein. These examples should not, however, be construed as limiting the scope of the invention as there are many variations which may be made thereon without departing from the spirit of the disclosed invention, as those of skill in the art will recognize.

EXAMPLES 1–11

Examples 1–11 illustrate the preparation of high reactivity polyolefins that are useful in producing copolymers of the present invention. All metallocene and aluminoxane cocatalyst manipulations in these examples were carried out in a glove box under nitrogen, and high vacuum techniques were used as needed. Determination of the amount of terminal vinylidine in a polymer sample was carried out using either $^{13}C$ or $^1H$ NMR by integration of the peak areas in the appropriate olefinic regions. Molecular weights were determined using gel permeation chromatography (GPC). Following the reaction, the catalyst was quenched in each example by the addition of 5 ml of isopropanol from a small bomb that was pressurized to 150 psi with nitrogen. The reactor was vented while maintaining the temperature at 25–55° C. The reactor contents were cooled, diluted with heptane and washed with 250 ml of 2N NaOH and then with four 250 ml portions of distilled water. The organic layer was separated, dried over anhydrous $MgSO_4$, and filtered. The solvent was stripped by heating to 150° C. under vacuum for approximately two hours.

In each of Examples 1–11, a 10% (5.9 wt. % of aluminum) solution of methyl alumoxane (MAO) in toluene was employed as a cocatalyst. The methyl alumoxane was used as received from Witco Corporation.

Example 1

Propylene/1-Hexene Copolymer

In a dry box, a 1000 ml autoclave was charged with 6.0 mg of bis(indenyl)zirconium dichloride ($Ind_2ZrCl_2$), 100 ml of toluene and 2.45 ml of a solution of MAO in toluene (d=0.860 g/ml, 5.9 wt. % Al, Al/Zr ratio of about 300), and 4.26 g of anhydrous octane (internal standard). The autoclave was sealed, removed from the nitrogen atmosphere of the dry box, and heated to 55° C. The autoclave was charged with 20.2 g of dry 1-hexene followed by 135 g of dry polymer grade propylene added at 136 psig. The reactor was stirred at 55° C. for 1.5 hours. Work-up as described above gave 63.1 g of a polypropylene/1-hexene copolymer containing approximately 26% hexene based on GC analysis of the crude reaction mixture. This clear, viscous copolymer was determined to have a Mn of 1,555 and a dispersivity index (DI) of 1.7 using GPC. Proton NMR showed the product to contain vinylidene protons, observed in the 4.6 to 4.8 ppm region of the NMR spectrum. A terminal vinylidine content of better than 80% was calculated for this product.

Example 2

Propylene1-Decene Copolymer

A 1000 ml autoclave was charged with 6.0 mg of $lnd_2ZrCl_2$, 100 ml of toluene and 2.45 ml of a solution of MAO in toluene (d=0.860 g/ml, 5.9 wt. % Al, Al/Zr ratio of about 300), and 3.88 g of anhydrous decane (internal standard). The autoclave was sealed and removed from the dry box. The reactor was warmed to 55° C. and charged with 22.2 g of dry 1-decene, and then 100 g of dry polymer grade propylene at 136 psi. Stirring at 55° C. was continued for 1.5 hours. Work-up as described above gave 48.3 g of a propylene/1-decene copolymer containing approximately 21.5% 1-decene based on GC analysis of the crude reaction mixture. This clear, viscous copolymer was determined to have a Mn of 1,704 and a DI of 1.67. Using Proton NMR, a terminal vinylidine content of better than 80% was calculated for this product.

Example 3

Poly-1-Decene Polymer

A 1000 ml autoclave was charged with 10 mg of bis (cyclopentadienyl) zirconium dichloride ($Cp_2ZrCl_2$), 70 ml of toluene, and 300 ml of 1-decene. The autoclave was sealed and removed from the dry box. The reactor was warmed to 65° C. and charged with 2.7 ml of a solution of MAO in toluene (d=0.860 g/ml, 5.9 wt. % Al, Al/Zr ratio of about 150). Stirring at 65° C. was continued for 5 hours. Standard work-up yielded 134.8 g of poly(1-decene) (GPC Mn=211). Using Proton NMR, a terminal vinylidine content of better than 80% was calculated for this product.

Example 4

Poly-1-Hexene Polymer

A 1000 ml autoclave was charged with 12 mg of $Ind_2ZrCl_2$, 100 ml of toluene, 156 ml of 1-hexene, and 10 ml of anhydrous octane (internal standard). The autoclave was sealed and removed from the dry box. The reactor was warmed to 55° C. and charged with 5.0 ml of a solution of MAO in toluene (d=0.860 g/ml, 5.9 wt. %, Al, Al/Zr ratio of 300). Stirring at 55° C. was continued for 1.5 hours. Standard work-up yielded 32.1 g of poly(1-hexene) (GPC Mn=1, 142, DI=1.47). Using Proton NMR, a terminal vinylidine content of better than 80% was calculated for this product.

Example 5

Propylene/1-Butene Copolymer from Mixed Butane-Butene Feed

A butane and butene feed stock having an approximate composition of 8% propane, 9% propene, 39% isobutane, 14% 1-butene, 12% n-butane, 2% isobutylene, 15% cis and trans 2-butenes, 0.5% butadiene and small amounts (less than 1%) of other hydrocarbons was polymerized using $Ind_2ZrCl_2$ and methylaluminoxane as the catalyst system. A reaction vessel was sequentially charged with 4.0 mg of $Ind_2ZrCl_2$, 40 ml of toluene and 1.6 ml of a solution of MAO in toluene (d=0.860 g/ml, 5.9 wt. % Al, Al/Zr of about 300). The mixture was stirred for about 5 minutes followed by the addition of 93 g of the above feed. The reaction mixture was warmed to 50° C. and stirred at this temperature for 20 hours. After this time, the reactor was cooled and the catalyst was quenched with isopropanol. The crude reaction mixture was diluted with pentane, washed with 2N NaOH and water and dried over $MgSO_4$. Removal of volatile liquids under reduced pressure resulted in recovery of 10.8 g (61% yield based on the propene and 1-butene content) of a clear, viscous material (GPC Mn=578, DI=1.91). $^{13}C$ NMR showed major peaks at 109.9–110.1, 112.3–112.5, 145.0–145.3 and 150.5–150.8 ppm. The presence of four peaks indicated chain termination with both propene and butene. A $^1H$ multiplet in the range of 4.6 to 4.8 ppm was also found, and a terminal vinylidene content of greater than 80% was calculated for the product.

Example 6

Polypropylene

A Fischer-Porter pressure vessel was sequentially charged with 6.7 mg of $Ind_2ZrCl_2$, 25 ml of toluene and 2.0 ml of a solution of MAO in toluene (d=0.860 g/ml, 5.9 wt. % Al, Al/Zr of about 220). This mixture was stirred for about 5 minutes followed by addition of propylene at a constant pressure of 40 psig. The reaction mixture was stirred at 53° C. for 20 hours, quenched with isopropanol, extracted into pentane, washed with 2N NaOH and water and dried over $MgSO_4$. Removal of volatile liquid under reduced pressure resulted in recovery of 135 g of a clear, viscous material. $^{13}C$ NMR showed major peaks at 112.3–112.5 and 145.0–145.3 ppm. This viscous polypropylene had a GPC Mn of 987 and a Mw/Mn of 1.70. Using Proton NMR, a terminal vinylidine content of better than 90% was calculated for this product.

Example 7

Polypropylene

A Fischer-Porter reaction vessel was sequentially charged with 8.1 mg of $Cp_2ZrCl_2$, 50 ml of toluene and 2.2 ml of a solution of MAO in toluene (d=0.860 g/ml, 5.9 wt. % Al, Al/Zr of about 150). The mixture was stirred for about 5 minutes followed by addition of propylene at 40 psig for 1 hour. The reaction mixture was stirred at 50° C. for 1 hour, quenched with isopropanol, extracted into pentane, washed with 2N NaOH and water and dried over $MgSO_4$. Removal of the liquid under reduced pressure resulted in recovery of 15.0 g of a clear, viscous material. 13C NMR showed major peaks at 112.3–112.5 and 145.0–145.3 ppm. This viscous polypropylene had a GPC Mn of 474, a Mw/Mn of 2.18 and a terminal vinylidine content of 90%.

Example 8

Viscous Poly-1-butenes

A reaction vessel was sequentially charged with 6.7 mg of $Ind_2ZrCl_2$, 25 ml of toluene and 2.0 ml of a solution of MAO in toluene (d=0.868 g/ml-, 5.9 wt. % Al; Al/Zr of about 220). The mixture was stirred for about 5 minutes followed by addition of 200 g of 1-butene. The reaction mixture was stirred at 40° C. for 20 hours, quenched with isopropanol, extracted into pentane, washed with 2N NaOH and water and dried over $MgSO_4$. Removal of the liquid under reduced pressure resulted in recovery of 190 g of a clear, viscous material. 13C NMR analysis showed the terminal vinylidine content to be greater than 80%. This viscous poly-1-butene had an Mn of 1860 and a Mw/Mn of 1.64.

Example 9

Viscous Poly-1-butenes

A pressure vessel was sequentially charged with 5.0 mg of $Cp_2ZrCl_2$, 25 ml of toluene and 2.0 ml of a solution of MAO in toluene (d=0.860 g/ml, 5.9 wt. % Al, Al/Zr of about 220). The mixture was stirred for about 5 minutes followed by addition of 200 g of 1-butene. The reaction mixture was stirred at 40° C. for 20 hours, quenched with isopropanol, extracted into pentane, washed with 2N NaOH and water and dried over $MgSO_4$. Removal of the liquid under reduced pressure resulted in recovery of 160 g of a clear, viscous material. This product had a Mn of 661, a Mw/Mn of 1.92, and a terminal vinylidine content of greater than 80%.

Example 10

1-Butene/1-Hexene Copolymer

In a dry box, a 300 ml autoclave was charged with 6.0 mg of bis indenyl zirconium dimethyl ($Ind_2ZrMe_2$), 9 ml of toluene and 2.45 ml of a solution of MAO in toluene (d=0.860 g/ml, 5.9 wt. % Al, Al/Zr ratio of about 300). The autoclave was sealed, removed from the nitrogen atmosphere of the dry box, and heated to 45° C. The autoclave was charged with 30 g of dry 1-hexene followed by 80.5 g of dry polymer grade 1-butene. The reactor was stirred at 45° C. for 1 hour. Standard work-up as described previously gave 7.08g of a poly-1-butene/1-hexene copolymer. This clear, viscous copolymer was determined to have a Mn of 1654 and a DI(dispersivity index) of 1.47 using GPC. Proton NMR showed the product to contain vinylidene protons in the 4.6 to 4.8 ppm region of the NMR spectrum, where protons bonded to carbon—carbon double bonds are known to absorb; a terminal vinylidine content of greater than 80% was calculated for the product.

Example 11

1-Butene1-Decene Copolymer

This Example was run similarly to Example 9 except that 30 g of dry 1-decene and 74.4 g of dry polymer grade 1-butene were charged. Standard work-up yielded 82.4 g of a poly-1-butene/1-decene copolymer. This copolymer was determined to have a GPC Mn of 1712 and a DI(dispersivity index) of 1.51. Proton NMR showed the product to contain vinylidene protons in the 4.6 to 4.8 ppm region of the NMR spectrum. A terminal vinylidine content of greater than 80% was calculated for the product.

EXAMPLES 12–21

In each of Examples 12–21, a 3 oz Fischer-Porter pressure reactor was equipped with a mechanical stirrer, a thermocouple, a metering pump for adding monomer or initiator against internal pressure, a nitrogen inlet, a pressure gauge, and a pressure relief valve. The reactor vessel was charged with the polyolefin or polyolefin mixture, the initiator, and the solvent (where employed). The reactor contents were then purged with nitrogen and the reactor sealed. The stirrer was turned on, and the reactor was lowered into a preheated bath. The aforesaid vinyl monomer or monomer mixture was then dispensed from a nitrogen blanketed reservoir by a metering pump. After the run, the reactor was allowed to cool and was vented, and the excess unreacted monomer(s) and/or solvents were removed using a vacuum of 23 mm Hg or less. Generally, the solid product was stirred with heptane and filtered to collect the solid copolymer. The heptane wash was retained to collect any unreacted polyolefin. Alternately, the solid product was dissolved in a suitable solvent and then reprecipitated by dropwise addition of the solution into an anti-solvent.

Example 12

The Fischer-Porter apparatus described above was charged with 3.2 g of polybutene with a vinylidene olefin content of better than 75%, a molecular weight (Mn) of 1,036, and a DI of 1.31. The reactor was placed in a bath heated to 130° C. When the internal temperature reached 120° C., a mixture of 24 g of styrene, 8 g of acrylonitrile and 0.3 g of t-butyl peroxybenzoate was then metered dropwise to the stirred polybutene. The temperature of the reaction mixture raised to 125° C. and was maintained at this temperature as the addition of styrene, acrylonitrile, and t-butyl peroxybenzoate was completed over approximately 5 hours. Once the addition was complete, the viscous reaction mixture was heated for an additional hour. The reaction was quenched by the addition of a small quanitity of hydroquinone dissolved in acetone. Acetone and unreacted monomers were removed under vacuum to yield 29.4 g (83% yield) of polybutene modified SAN copolymer. A solution of 12.97 g of this copolymer dissolved in 300 ml of acetone was slowly added to 1500 ml of isopropanol. The precipitate (11.37 g) was collected and dried in a vacuum oven to remove residual solvents. $^{13}$C NMR analysis revealed that this precipitate was a styrene acrylonitrile copolymer in which 2.87% polybutene had been incorporated. No $^{13}$C polybutene olefinic peaks were observed in the typical area, between 114 and 145 ppm, in this spectrum.

Example 13

The procedure of Example 12 was repeated with the modifications described below. The apparatus above was charged with 1.65 g of polybutene with a vinylidene olefin content of better than 75%, a molecular weight (Mn) of 1,036, and a DI of 1.31, 8.0 g of acrylonitrile, 24.0 g styrene, and 0.016 g of benzoyl peroxide. The reactor was purged with nitrogen, sealed, and placed in a bath heated to 75° C. for 4 hours. The reaction was quenched with a small quantity of hydroquinone in acetone. The acetone and unreacted monomers were removed under vacuum at at 99° C. for approximately 2 hours to yield 11.05 g of a crude polybutene modified SAN copolymer. Reprecipitation of this polymer from acetone/isopropanol yielded 9.74 g of a styrene acrylonitrile copolymer in which 6.26% polybutene had been incorporated based on $^{13}$C NMR analysis.

Example 14

The Fischer-Porter apparatus described above was charged with 3.2 g of polybutene with a vinylidene olefin content of better than 75%, a molecular weight (Mn) of 1,036, and a DI of 1.31, and 0.3 g of t-butyl peroxybenzoate. The reactor was placed in a bath heated to 135° C. When the internal temperature reached 114° C., a mixture of 24 g of styrene and 8 g of acrylonitrile was metered dropwise to the stirred reactor. The temperature of the reaction mixture raised to 124° C. and was maintained at this temperature as the addition of styrene and acrylonitrile was completed over approximately 2 hours. Once the addition was complete, the reaction mixture was heated for an additional 0.5 hour, cooled to room temperature, and then quenched with hydroquinone in acetone. Following work up in the usual manner, 30.28 g of a crude polybutene modified SAN copolymer was obtained. A solution of 2 g of this copolymer dissolved in 50 ml of acetone was slowly added to 200 ml of isopropanol. The precipitate (1.73 g) was collected and dried in a vacuum oven to remove residual solvents. $^{13}$C NMR analysis revealed that this recipitate was a styrene acrylonitrile copolymer in which 1.6% polybutene had been incorporated. No 13C Polybutene olefinic peaks were observed in the typical area, between 114 and 145 ppm, in this spectrum.

Example 15

The procedure of Example 12 was repeated with the modifications described below. The apparatus above was charged with 13.1 g of polybutene with a vinylidene olefin content of better than 75%, and a molecular weight (Mn) of 435, 12 g of chlorobenzene, and 0.1 g of benzoyl peroxide. The reactor was purged with nitrogen, sealed, and placed in a bath heated to 80° C. Acrylonitrile (27 grams) was then metered dropwise into the stirred reactor over approximately 10 minutes. Once the addition was complete, the reaction mixture was heated for an additional 2.5 hours. The reaction was quenched with hydroquinone in acetone. Solvent and unreacted monomer were removed using a vacuum of 0.3 mm Hg at 110° C. Following removal of solvents and monomer, 19.95 g of a crude polybutene modified polyacrylonitrile polymer was obtained. This solid was ground and stirred with heptane to remove unreacted polybutene. $^{13}$C NMR analysis revealed that the precipitate (10.23 g) was a polyacrylonitrile copolymer in which 8.36% polybutene had been incorporated. No $^{13}$C Polybutene olefinic peaks were observed in the typical area, between 114 and 145 ppm, in this spectrum. Double bond analysis using $^{13}$C NMR of the heptane soluble fraction showed that the copolymerization took place almost exclusively at the vinylidene double bond.

Example 16

The procedure of Example 15 was repeated with the modifications described below. The apparatus above was charged with 14.0 g of polybutene with a vinylidene olefin content of better than 80%, and a molecular weight (Mn) of 361, 12 g of chlorobenzene, and 0.1 g of benzoyl peroxide. The reactor was heated to 80° C. for one hour. Acrylonitrile (26 grams) was added dropwise to the stirred reactor over approximately 3 hours and the mixture heated for an additional 5 hours. Following standard work-up, including stirring the precipitate with heptane, 9.01 g of a crude polybutene modified polyacrylonitrile polymer was obtained. $^{13}$C NMR analysis revealed that the precipitate (10.23 g) was a polyacrylonitrile copolymer in which 14.7% polybutene had been incorporated. HPLC analysis of the hexane soluble material revealed it to be polybutene in which the vinylidene olefin isomer was depleted relative to the other olefin isomers.

A solution of 3 g of this copolymer dissolved in 75 ml of dimethylformamide was slowly added to 350 ml of heptane. The precipitate (2.96 g) was collected and dried in a vacuum oven to remove residual solvents. $^{13}$C NMR analysis revealed that this precipitate contained 14% polybutene.

Example 17 (Comparison)

The procedure of Example 15 was repeated using 14.0 g of a polybutene with a vinylidene olefin content of less than 10%, and a molecular weight (Mn) of 361 in place of the comparable 80% vinylidene olefin material. Following standard work-up, including stirring the precipitate with heptane, 14.17 g of a crude polymer was obtained. A solution of 2.09 g of this polymer dissolved in 54 ml of dimethylformamide was slowly added to 250 ml of heptane. The precipitate (1.82 g) was collected and dried in a vacuum oven to remove residual solvents. $^{13}$C NMR analysis revealed that this precipitate contained no polybutene. IR analysis of the filtrate revealed it to be (unreacted) polybutene. HPLC analysis of this material revealed that the relative ratio of isomers remained unchanged.

Example 18

The procedure of Example 12 was repeated with the modifications described below. The apparatus above was charged with 14.0 g of polybutene with a vinylidene olefin content of 26%, a molecular weight (Mn) of 1,351, and a DI of 1.33, 12 g of chlorobenzene, and 0.1 g of benzoyl peroxide. The reactor was heated to 80° C. for one hour. Acrylonitrile (26 grams) was added dropwise to the stirred reactor over approximately 2 hours and the mixture heated for an additional hour. Following standard work-up, including removal of volatiles under vacuum and stirring the precipitate with heptane, 13.27 g of a crude polybutene modified polyacrylonitrile polymer was obtained. A solution of 2 g of this copolymer dissolved in 50 ml of dimethylformamide was slowly added to 250 ml of heptane. The precipitate (1.61 g) was collected and dried in a vacuum oven to remove residual solvents. $^1$H NMR analysis revealed that this precipitate contained 0.35% polybutene.

Example 19

The procedure of Example 18 was repeated with the exception that 14.0 g of polybutene with a vinylidene olefin content of better than 80%, and a molecular weight (Mn) of 2,451, and a DI of 1.44 was used. Following standard work-up, including removal of volatiles under vacuum and stirring the precipitate with heptane, 11.03 g of a crude polybutene modified polyacrylonitrile polymer was obtained. A solution of 0.75 g of this copolymer dissolved in 75 ml of dimethylformamide was slowly added to 1,000 ml of heptane. The precipitate (0.75 g) was collected and dried in a vacuum oven to remove residual solvents. $^1$H NMR analysis revealed that this precipitate contained 3.5% polybutene.

Examples 20–21

In each of Examples 20–21, the general procedure of Example 14 was followed, except that, instead of polybutane, 14 grams of poly-1-decene having a vinylidene content of greaer than 80% and a number average molecular weight of 211 was employed as the high reactivity polyolefin in Example 20, and 14 grams of polypropylene having a vinylidene content of greater than 90% and a number average molecular weight of 474 (from Example 7 above) was employed as the high reactivity polyolefin in Example 21. In each example, 26 grams of acrylonitrile was employed as the vinyl monomer. The poly-1-decene was prepared in accordance with the procedure of Example 3. In Example 20, 9.49 grams of copolymer containing 13% of poly-1-decene were produced. In Example 21, 9.21 grams of copolymer containing 16% of polypropylene were produced.

EXAMPLES 22–24

Example 22

A 300 ml Parr reactor equipped with mechanical stirrer was charged at room temperature with 20.11 g of styrene, 0.20 g of t-butyl peroxybenzoate, and 79.99 g of a high vinylidene polybutene with a number average molecular weight of 408. The reactor content was heated to 120° C. over a period of 30 minutes with stirring. The reaction temperature was maintained at 120° C. (±4° C.) for 3 hours with vigorous stirring. After cooling to room temperature, the reaction mixture was completely dissolved using 200 ml of 1,2-dichloroethane and transferred to a large beaker. To the beaker content was added to a solution containing a mixture of 150 ml heptane/600 ml isopropyl alcohol in order to precipitate the polymer. The solid polymeric material was filtered and washed with 200 ml of heptane in order to remove the bulk of unreacted polybutene. The solid polymeric material was dried in a vacuum oven at 115° C. for 2.5 hours and resulted in isolation of 9.31 g of a white solid.

In order to ensure complete removal of unreacted polybutene, initially 8.96 g of this material was fully dissolved in 90 ml of 1,2-dichloroethane followed by precipitation with a solution mixture containing 90 ml heptane/360 ml isopropyl alcohol and filtration. The solid polymeric material was washed with an additional 90 ml of heptane and the filtrates were combined. The solid polymeric material after vacuum drying (at 115° C. for 2.5 hours) resulted in isolation of 7.29 g of a white polymeric powder (compound I). Removal of solvents from the combined filtrate resulted in isolation of 0.56 g of a waxy/viscous material. The entire extraction process was repeated once more by completely dissolving 7.02 g of the solid polymeric material (compound I) in 70 ml of 1,2-dichloroethane followed by precipitation with a solution mixture containing 70 ml heptane/280 ml isopropyl alcohol and washing of the solid polymer with an additional 70 ml of heptane which resulted in isolation of 6.45 g of a final solid polymeric material (compound II). Removal of solvent from the combined filtrate resulted only in isolation of a residue with a weight of 0.08 g. The final polymeric material (compound II) was analyzed by $^{13}C$ NMR. Vinylidene olefin signals of polybutene double bond had disappeared and integration of polystyrene signals (C-1 at 143–148 ppm; C-2,3,4,5,6 at 122–133; $CH+CH_2$) over polybutene signal (headgroup signal at 32.3 ppm) indicated a copolymer of styrene/polybutene containing 3.1 wt % polybutene.

Example 23

This experiment was conducted in a manner identical to Example 22 by employing 20.02 g of styrene, 0.20 g of t-butyl peroxybenzoate, and 79.99 g of high vinylidene polybutene with a number average molecular weight of 960. After isolation of the crude polymeric material, complete removal of unreacted polybutene as described in Example 22 resulted in isolation of 9.86 g of the final solid polymeric material. $^{13}C$ NMR analysis of this material indicated a copolymer of styrene/polybutene containing 2.0 wt % polybutene.

Example 24 —Comparison

Indopol® Polybutene commercially produced by Amoco was employed in this comparative example. Indopol® H-1.00 polybutene having a number average molecular weight of 985 and a vinylidene olefin (by $^{13}C$ NMR) content of less than 10% was employed in this experiment. The reaction was conducted in a manner identical to Example 22 by charging the reactor with 20.07 g of styrene, 0.20 g of t-butyl peroxybenzoate, and 79.91 of Indopol® H-100 polybutene. After isolation of the crude polymeric material, complete removal of unreacted polybutene as described in Example 22 resulted in isolation of 12.66 g of the final solid polymeric material. $^{13}C$ NMR analysis of this material showed a polystyrenic material containing only 0.7 wt % polybutene.

Example 25

A 1 l autoclave was fitted with a mechanical stirrer with two four-blade flat turbines, internal and external cooling coils, a thermocouple, a general purpose inlet, a nitrogen inlet, a pressure gauge, and a pressure relief valve. The reaction vessel was charged with 10 g of a high (>80 percent) vinylidene polybutene with a number average molecular weight of 408. An aqueous suspension medium was next added. The suspension medium was prepared by dissolving 0.5 g polyvinylpyrrolidone (Mw=10,000), and 0.25 g Darvan 1 (an emulsifier from R. T. Vanderbilt), in 200 ml of de-ionized water. The solution was brought to a boil under a nitrogen blanket to remove oxygen. The solution was allowed to cool and the suspension medium was poured into the autoclave. The initiator (0.40 g lauroyl peroxide) was added to the reactor, and the reactor was sealed and a vacuum was applied. A small quantity of distilled vinyl chloride was added to the reactor bringing the internal pressure to 20–30 psi. Vacuum was again applied. Pressuring the autoclave to 20–30 psi with vinyl chloride and subsequent removal was repeated two additional times to remove oxygen from the system. Vinyl chloride monomer (102 g) was then charged to the reactor with agitation. The reactor was sealed and heated to 60° C. for 10 hours. The reactor contents were cooled and the reactor was vented and flushed with nitrogen. Nitrogen flushing was allowed to continue overnight. The crude polymer was recovered by filtration and washed several times with deionized water.

The solid was then vacuum dried (at 40° C. for 2.5 hours), ground and stirred with 500 ml of heptane to remove unreacted polybutene. $^{13}C$ NMR analysis revealed that the precipitate (37 g) was a polyvinyl chloride polymer in which 3.6% polybutene had been incorporated. No $^{13}C$ Polybutene olefinic peaks were observed in the typical area, between 114 and 145 ppm, in this spectrum. Double bond analysis using $^{13}C$ NMR of the heptane soluble fraction showed that the copolymerization took place almost exclusively at the vinylidene double bond.

Example 26

This example illustrates preparation of a copolymer of a high vinylidene polybutene, methyl methacrylate, butyl acrylate and methacrylic acid. The high vinylidene polybutene was prepared by polymerization of isobutylene using boron trifluoride-etherate catalyst and had a vinylidene content of about 82% and a number average molecular weight of 1092.

Step A

In a 3-necked flask assembled with a condenser, Eurotherm temperature probe, and addition funnel, add 100 g of deionized water and 1.1 g of Polystep B-11 (ethoxylated lauryl sulfate, available from Stepan Chemical Co., Northfield, Ill.) and heat to 180° F. (82.2° C.).

Step B

Prepare a monomer emulsion by stirring together in a beaker the following: 80 g deionized water, 3.0 g Polystep B-11 (Ethoxylated lauryl sulfate), 1.6 g methacrylic acid, 8 g high vinylidene polybutene, 87 g methyl methacrylate, and 70 g butyl acrylate.

Step C

Make a solution of 1 g ammonium persulfate in 10 g water.

Step D

When the temperature of the mixture of Step A reached 180° F., the ammonium persulfate solution of Step C was added. This was followed by addition of 30 g of the monomer emulsion of Step B. Then slowly, over a period of 1 hour, the rest of the monomer emulsion of Step B was added. At the end of the monomer emulsion addition, the reaction mixture was stirred for an additional 3 hours while maintaining the temperature at 180° F.–184° F. (82.2° C.–84.4° C.). At the end of the 3 hours, the reaction was cooled to room temperature and filtered.

The product was air-dried and analyzed. The double bond analysis by means of $^{13}C$-NMR showed that the addition proceeded exclusively on the terminally located double bonds.

Example 27

This example illustrates the preparation of a copolymer of a high reactivity polybutene, styrene, butyl acrylate, 2-ethyl hexyl acrylate, methyl methacrylate and methacrylic acid. The high vinylidene polybutene was prepared by polymerization of isobutylene using boron trifluoride-etherate catalyst and had a vinylidene content of about 82% and a number average molecular weight of 1092.

Step A

To a 3-necked flask assembled with a condenser, Eurotherm temperature probe, and addition funnel, was added 200 g of deionized water and 2.2 g of Polystep B-11 (ethoxylated lauryl sulfate) and heat to 180° F. (82.2° C.).

Step B

Prepare a monomer emulsion by stirring together in a beaker the following: 160 g deionized water, 6.0 g Polystep B-11 (Ethoxylated lauryl sulfate), 12 g methacrylic acid, 16 g high vinylidene polybutene, 99 g methyl methacrylate, 61 g butyl acrylate, 88 g styrene, and 70 g 2-ethylhexyl acrylate.

Step C

Make a solution of 2.20 g ammonium persulfate and 2.02 g sodium carbonate in 20 g deionized water.

Step D

When the temperature of the reaction flask in Step A reached 180° F. (82.2° C.), the solution prepared in Step C was added. This was followed by addition of 60 g of the monomer emulsion prepared in Step B. Then slowly, over a period of 1 hour, the rest of the monomer emulsion was added. At the end of the addition, the reaction mixture was stirred for an additional 3 hours while maintaining the temperature at 180° F. (82.2° C.). At the end of the 3 hours, the reaction was cooled to room temperature and filtered.

The product was air-dried and analyzed. The double bond analysis by means of $^{13}$C-NMR showed that the addition proceeded exclusively on the terminally located double bonds.

Example 28 (Comparison)

This example illustrates the preparation of a comparison polymer for Example 27. This is a preparation of a copolymer of styrene, butyl acrylate, 2-ethyl hexyl acrylate, methyl methacrylate and methacrylic acid but without high vinylidene polybutene.

Step A

In a 3-necked flask assembled with a condenser, Eurotherm temperature probe, and addition funnel, add 200 g of deionized water and 2.2 g of Polystep B-11 (ethoxylated lauryl sulfate) and heat to 180° F.

Step B

Prepare a monomer emulsion by stirring together in a beaker the following: 160 g deionized water, 6.0 g Polystep B-11 (Ethoxylated lauryl sulfate), 12 g methacrylic acid, 99 g methyl methacrylate, 61 g butyl acrylate, 88 g styrene, and 70 g 2-ethylhexyl acrylate Step C Make a solution of 2.20 g ammonium persulfate and 2.02 g sodium carbonate in 20 g deionized water Step D When the temperature of the reaction flask in Step A reached 180° F.(82.2° C.), the solution prepared in Step C was added. This was followed by addition of 60 g of the monomer emulsion prepared in Step B. Then slowly, over a period of 1 hour, the rest of the monomer emulsion was added. At the end of the addition, the reaction mixture was stirred for an additional 3 hours. At the end of the 3 hours, the reaction was cooled to room temperature and filtered.

Example 29

This example illustrates incorporation of high reactivity polybutene into vinyl acetate-containing polymer. The high vinylidene polybutene was prepared by polymerization of isobutylene using boron trifluoride-etherate catalyst and had a vinylidene content of about 82% and a number average molecular weight of 1092.

Step A. In a three-necked flask assembled with a condenser, Eurotherm temperature probe, and additional funnel, add 100 g of $H_2O$ and 1.1 g of ethoxylated lauryl sulfate (Polystep B-11) and heat to 180° F.

Start

Step B. Prepare a monomer emulsion by stirring together in a beaker the following: 80 g $H_2O$, 3.0 g Polystep B-11, 75.2 g vinyl acetate, 40 g butyl acrylate, 32 g 2-ethylhexyl acrylate, 8 g methacrylic acid, and 7.3 g high vinylidene polybutene Step C. Make a solution of 1 g, sodium carbonate, and 1 g ammonium persulfate in log deionized water Step D. When the content of the flask (reaction mixture A) has reached 180° F. (82.2° C.), add the solution prepared in Step C. Next, add 30 g of the monomer emulsion prepared in B to the flask and wait 10 minutes. Then slowly add, over 1 hour, the rest of monomer emulsion B to the flask. After all of monomer emulsion B has been added, hold the reaction at 180° F. (82.2° C.) for 2 hours, then slowly cool the reaction mixture. When the temperature of the reaction mixture reaches 120° F. (48.9° C.), add 4.2 g of a 28% ammonium solution. Filter the reaction mixture at room temperature.

Description of Application Test Methods

1. Print Resistance Test

Cast the paint to be tested on a glass slide using the drawdown block with 5 mil opening. Condition glass slides in the controlled temperature room (CTR) (25° C.; 50% relative humidity [R.H.]) for 7 days.

After the panels have been conditioned, cut out approximately 1½"×1½" pieces of cheesecloth, one piece for each test panel (note: use cheesecloth as supplied with all 4 layers intact. Do not separate layers.)

Place one piece of cheesecloth over each test specimen, and top with a no. 8 rubber stopper, and 500 gram weight. One weight and stopper for each paint to be tested (weights and stoppers should be equilibrated in the oven prior to running the test).

Place entire assembly in the 60° C. (140° F.) oven for exactly one hour. After this time remove the stoppers and weights and remove the test specimen from oven. Allow the specimens to cool (about ½ hour) before removing the cheesecloth, and evaluating for the print.

Remove cheesecloth, and carefully examine paint film under the cheesecloth. Note depth and amount of impression of cheesecloth pattern left imprinted on paint film surface. (Note: sometimes it is necessary to hold glass slide up to light to catch glare of light off of paint in order to observe impression). Rate for print resistance on the scale of 0 to 10 where 0 indicates the least print resistance and 10 indicates the greatest print resistance.

2. Peel Block Resistance

Cast the paint to be tested on 5 c Leneta chart using 3 mil Bird applicator. Condition panels in the CTR (25° C.; 50% R.H.) for 7 days.

After the panels are conditioned, cut out 1½"×1½" sections from white area of the chart of the paints to be tested.(two sections from each chart).

Place the cut sections with the paint surfaces face to face, for each paint to be tested.

Place the face to face specimen in a 50° C. (120° F.) oven. Top with a no. 8 rubber stopper and a 1000 g. weight. One weight for each paint to be tested. (Weights and stoppers should be equilibrated in the oven prior to running test.)

After exactly 30 mins, remove the stoppers and the weights and remove test sections from the oven. Allow test specimens to cool(about ½ hour) at room temperature before running the test.

After cooling, separate sections with slow and steady force, pulling apart at approximately 180° angle. Rate for block resistance on a scale of 0 to 10 where 0 indicates the least block resistance and 10 indicates the greatest block resistance.

3. Blister resistance Test

Apply 2 coats of test paint (24 hrs between coats) onto a test panel in CTR. The test panels must be smooth, uniform and with minimum imperfection. Allow the panels to dry for 7 days. Fill the blister-box with water. Maintain a tight seal between adjacent boards and set the temperature gauge to 140° F. (60° C.). Allow the panels to stay in the blister box for 250 hours. Remove the panels and rate any blister. The size of the blisters is rated 1–10, with 1 being large blisters and 10 no blisters. The density of blisters can be dense (D), medium (M) or few (F). Small and few blisters (9F) is considered better than large and dense (1D).

Paint Formulation and Testing Typical Preparation of Aqueous Coating Formulation A. This illustrates a typical paint made in a standard paint formulation using the copolymer emulsion of Example 27.

TABLE 1

Paint Formulation Using the Copolymer Emulsion of Example 27

| INGREDIENT | AMOUNT (Parts By Wt.) |
|---|---|
| Propylene glycol | 21.7 |
| Dispersant | 4.5 |
| Defoamer | 0.4 |
| Acrysol RM-825 | 0.23 |
| RM-2020 | 6.0 |
| Rutile Titanium Dioxide | 89 |
| Water | 3 |
| Latex Emulsion (copolymer emulsion prepared in Example 27) | 181.2 |
| Coalescent* | None |

*The paint formulation made with the copolymer emulsion of Example 27 has the advantage that no coalescent has to be added.

B. This illustrates a typical paint made in a standard paint formulation using the copolymer emulsion of Comparison Example 28.

TABLE 2

Paint Formulation Using the Copolymer Emulsion of Comparison Example 28

| INGREDIENT | AMOUNT (Parts By Wt.) |
|---|---|
| Propylene glycol | 21.7 |
| Dispersant | 4.5 |
| Defoamer | 0.4 |
| Acrysol RM-825 | 0.23 |
| RM-2020 | 6.0 |
| Rutile Titanium Dioxide | 89 |
| Water | 3 |
| Latex Emulsion (copolymer emulsion prepared in Comparison Example 28) | 181.2 |
| Texanol Coalescent | 8.1 |

Acrysol RM-825 and RM-2020 are thickeners which can be obtained from Rohm and Haas. Texanol is an ester-alcohol which can be obtained from Eastman Chemicals.

Application Testing—Properties of Formulated Paint

Example 27 and Comparison Example 28 were tested in a fully formulated paint. The paint formulations used in the tests are shown in Tables 1 and 2 above. The procedure for the testing are discussed in the Description of Application Test Methods section. The data summarized below in Table 3 show that the paint composition using a copolymer of the invention (Example 27) is superior to a system without polybutene with respect to Block resistance, Print Resistance and Blister Resistance.

TABLE 3

Effect of Incorporated High Vinylidene Polybutene on Paint Application Properties

| Test | Paint Formulation with Example 27 Copolymer Emulsion | Paint Formulation with Comparison Example 28 Copolymer Emulsion |
|---|---|---|
| Print Resistance | 8 | 3 |
| Block Resistance | 10 | 2 |
| Gloss (20°) | 21 | 36 |
| Blister Resistance | 8F | 8D |

That which is claimed is:

1. A graph copolymer formed by the free radical polymerization of reactant components consisting essentially of (1) $CH_2=C(R)COOR^1$ where R is hydrogen or $C_1-C_4$ alkyl and $R^1$ is hydrogen or $C_1-C_{10}$ alkyl an (2) a high reactivity polyolefin of a $C_3-C_{20}$ olefin having a terminal alkylvinylidene content of at least about 80% and a number average molecular weight of about 200 to about 10,000.

2. The copolymer of claim 1, wherein $CH_2=C(R)COOR^1$ is selected from the group consisting of methacrylic acid, methyl methacrylate, butyl acrylate, and 2-ethylhexyl acrylate.

3. The copolymer of claim 1, wherein said high reactivity polymer has a number average molecular weight of about 300 to about 7500.

4. The copolymer of claim 3 wherein said high reactivity polymer has a number average molecular weight of about 500 to about 5000.

5. The copolymer of claim 4 wherein said high reactivity polymer has a number average molecular weight of about 500 to about 3000.

6. The copolymer of claim 1 wherein said $C_3-C_{20}$ olefin is isobutylene and said high reactivity polymer is polyisobutylene.

7. The copolymer of claim 1 having a number average molecular weight of from about 80,000 to about 1,500,000.

8. The copolymer of claim 7 having a number average molecular weight of from about 300,000 to about 1,000,000.

9. A multilayer structure comprising at least one substrate coated with at least one layer of a coating comprising a copolymer of claim 1.

10. A multilayer structure comprising at least one substrate coated with at least one layer of a coating comprising a copolymer of claim 4.

* * * * *

UNITED STATES PATENT AND TRADEMARK OFFICE
CERTIFICATE OF CORRECTION

PATENT NO.     : 6,583,228 B2
DATED          : June 24, 2003
INVENTOR(S)    : Asare Nkansah, Vahid Bagheri and Lionel Moore It is certified that error appears in the above-identified patent and that said Letters Patent is hereby corrected as shown below:

Column 3,
Line 24, should read, -- an ester, amide, and/or nitrile of an -- instead of "an ester, amide and/or nitrite of an"

Column 9,
Line 18, should read, -- represented by the general formula $(R-Al-O)_n$ -- instead of "represented by the general formula (R-Al-O)"

Column 19,
Lines 44-45, should read, -- charged with 4.0 mg of $Ind_2ZrCl_2$. -- instead of "charged with 4.0 mg of $lnd_2ZrCl_2$."

Column 22,
Lines 59-60, should read, -- The apparatus above was charged with 13.0 of polybutene -- instead of "The apparatus above was charged with 13.1 of polybutene"

Column 30,
Line 25, reads, "A graph copolymer formed by the free radical" should read -- A graft copolymer formed by the free radical --

Signed and Sealed this

Fourteenth Day of October, 2003

JAMES E. ROGAN
*Director of the United States Patent and Trademark Office*